United States Patent
Grancharov et al.

(10) Patent No.: US 9,313,334 B2
(45) Date of Patent: Apr. 12, 2016

(54) BANDWIDTH EXTENSION IN A MULTIPOINT CONFERENCE UNIT

(75) Inventors: Volodya Grancharov, Solna (SE); Mats Folkesson, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 654 days.

(21) Appl. No.: 13/695,568

(22) PCT Filed: Jun. 17, 2010

(86) PCT No.: PCT/SE2010/050677
§ 371 (c)(1),
(2), (4) Date: Oct. 31, 2012

(87) PCT Pub. No.: WO2011/159208
PCT Pub. Date: Dec. 22, 2011

(65) Prior Publication Data
US 2013/0044647 A1    Feb. 21, 2013

(51) Int. Cl.
H04N 7/15       (2006.01)
H04M 3/56      (2006.01)
G10L 25/69    (2013.01)
H04M 3/22      (2006.01)
G10L 21/038   (2013.01)

(52) U.S. Cl.
CPC .............. *H04M 3/567* (2013.01); *G10L 25/69* (2013.01); *H04M 3/2236* (2013.01); *H04N 7/152* (2013.01); *G10L 21/038* (2013.01)

(58) Field of Classification Search
CPC ..... G10L 25/69; G10L 21/038; H04M 3/567; H04M 3/2236; H04N 7/152
USPC .............................. 370/260; 348/14.08, 14.09
See application file for complete search history.

(56) References Cited

U.S. PATENT DOCUMENTS

2005/0237952 A1    10/2005    Punj et al.
2008/0004866 A1    1/2008    Virolainen et al.
(Continued)

FOREIGN PATENT DOCUMENTS

EP    1 420 389 A1    5/2004

OTHER PUBLICATIONS

Extension of the E-model towards super-wideband speech transmission; Marcel Waltermann, Izabela Tucker, Alexander Raake, and Sebastian Moller; Quality and Usability Lab, Deutsche Telekom Laboratories, TU Berlin, Germany; Publisher IEEE; Mar. 14-19, 2010.*

(Continued)

Primary Examiner — Mang Yeung
Assistant Examiner — Natali N Pascual Peguero
(74) Attorney, Agent, or Firm — Myers Bigel & Sibley, P.A.

(57) ABSTRACT

A multipoint conference unit includes input/output ports to communicate with at least three client terminals via at least three communication channels with each communication channel communicating with one of the at least three client terminals, a memory to store data streams communicated between multipoint conference unit and the client terminals, and a processor to mix data streams received from the client terminals and to store the mixed data streams in the memory. The processor also determines a number of each of three different types of communication channels and selectively implements bandwidth extension to the communication channels based on the determination.

8 Claims, 6 Drawing Sheets

(56) References Cited

U.S. PATENT DOCUMENTS

2008/0100694 A1* 5/2008 Barkley et al. ............. 348/14.08
2008/0285599 A1* 11/2008 Johansson et al. ............ 370/516
2011/0295598 A1* 12/2011 Yang et al. .................... 704/205

OTHER PUBLICATIONS

International Search Report, International Application No. PCT/SE2010/050677, Feb. 23, 2011, 5 pp.
Written Opinion of the International Searching Authority, International Application No. PCT/SE2010/050677, Feb. 23, 2011, 5 pp.
Raake et al. "Quality Degradation Due to Linear and Non-linear Distortion of Wideband Speech" *Forum Acusticum 2005 Budapest,* 4th European Congress on Acoustics, HU-Budapest, Aug. 29-Sep. 2, 2005, pp. 1683-1688.
International Telecommunication Union, Recommendation—"Method for objective measurements of perceived audio quality", Rec. ITU-R BS.1387-1, Nov. 2001, 100 pp.
International Telecommunication Union (ITU-T), "Series P: Telephone Transmission Quality—Methods for objective and subjective assessment of quality—Method for subjective determination of transmission quality", p. 800, Aug. 1996, 37 pp.
International Telecommunication Union (ITU-T), "Series P: Telephone Transmission Quality, Telephone Installations, Local Line Networks—Objective measuring apparatus—Single-ended method for objective speech quality assessment in narrow-band telephony applications", p. 563, May 2004, 66 pp.

\* cited by examiner

100
*(Background Art)*

| Case | $L_{NB}$ | $L_{WB}$ | $L_{SWB}$ | $SD$ | BWE |
|---|---|---|---|---|---|
| 1 | 0 | $\neq 0$ | 0 | $\geq \Theta$ | N |
| 1 | 0 | $\neq 0$ | 0 | $< \Theta$ | Y |
| 1 | 0 | 0 | $\neq 0$ | $\geq \Theta$ | N |
| 1 | 0 | 0 | $\neq 0$ | $< \Theta$ | Y |
| 1 | 0 | $\neq 0$ | $\neq 0$ | $\geq \Theta$ | N |
| 1 | 0 | $\neq 0$ | $\neq 0$ | $< \Theta$ | Y |
| 2 | $\neq 0$ | 0 | 0 | | Y |
| 3 | | | $\geq L_{WB} + L_{NB}$ | | Y |
| 3 | | $\geq L_{NB}$ | | | Y |
| 4 | | | $< L_{WB} + L_{NB}$ | $\geq \Theta$ | N |
| 4 | | | $< L_{WB} + L_{NB}$ | $< \Theta$ | Y |
| 4 | | $< L_{NB}$ | | $\geq \Theta$ | N |
| 4 | | $< L_{NB}$ | | $< \Theta$ | Y |

600

FIG. 6

BANDWIDTH EXTENSION IN A MULTIPOINT CONFERENCE UNIT

CROSS REFERENCE TO RELATED APPLICATION

This application is a 35 U.S.C. §371 national stage application of PCT International Application No. PCT/SE2010/050677, filed on 17 Jun. 2010, the disclosure and content of which is incorporated by reference herein in its entirety. The above-referenced PCT International Application was published in the English language as International Publication No. WO 2011/159208 A1 on 22 Dec. 2011.

TECHNICAL FIELD

This invention relates to a multipoint conference unit and more particularly, to utilizing a multipoint conference unit to determine bandwidth extension.

BACKGROUND

A multipoint audio conference call accommodates signals with large variety of bandwidth (BW) and/or signal distortions (SD).

A multipoint control or conference unit (MCU) may be utilized to manage the multipoint conference which can include both audio and video components. The MCU facilitates conferencing between three or more participants. A MCU mixes the audio (and/or video, data) streams from each participant (the participant may be associated with a client terminal) and transmits a single audio (and/or video, data) stream back to each participant.

A typical MCU 100 such as that illustrated in FIG. 1 includes input/output ports 110 for receiving audio streams and for transmitting mixed audio streams. MCU 100 also includes a memory 120 for storing received audio streams and the mixed audio streams that are to be transmitted. MCU 100 further includes a controller or processor 130 for performing the various functions of the MCU such as mixing the audio streams, etc. MCU 100 can be connected to the participant via a network such as the Internet for example.

A simplified description of an MCU has been provided for purely illustrative purposes, as an MCU is well known. Various components of an MCU are included without specific connection between these components being illustrated.

A multipoint conferencing arrangement 200 is illustrated in FIG. 2. MCU arrangement 200 includes at least three client terminals 210, 220 and 230 each communicating with MCU 260 via a network 250. Each client terminal (210, 220 and 230) sends unicast audio (and video) streams to MCU 260 via respective communication channels 215, 225 and 235. Each of the communication channels 215, 225 and 235 corresponds to a particular one of the client terminals 210, 220 and 230. That is, communication channel 215 provides communication between MCU 260 and client terminal 210; communication channel 225 provides communication between MCU 260 and client terminal 220; communication channel 235 provides communication between MCU 260 and client terminal 230. MCU 260 mixes the audio (and video) streams from each client terminal and transmits a single audio (and video) stream back to each client terminal via respective communication channels 215, 225 and 235.

Audio bandwidth is a range of audio frequencies that affect the sound quality (i.e. the degree to which sound is accurately reproduced). Audio bandwidth is the set of non-zero frequency components of an audio signal. The transmitted audio signal can be of varying bandwidths due to the different coding systems or bit constraints that are used.

Typical bandwidths determined by the coding system are 3.5 kHz, 7 kHz or above 14 kHz which correspond to narrowband, wideband and super wideband respectively. Some factors that affect the signal distortion level include: limited bit budget, noise suppressors, echo cancellers, automatic gain control, etc.

Quality optimization is difficult to achieve when dealing with multiple audio channels. These challenges are even more pronounced when control bandwidth extension (BWE) schemes based on bandwidth and signal distortions of the multiple audio channels are employed.

Bandwidth extension is a method for converting a speech signal (at a low frequency range such as 8 kHz for example) to a high quality speech signal (at a higher frequency range such as 12 kHz for example). It is often used to convert a telephone quality speech signal to a high quality wideband speech signal. The purpose of BWE is to reconstruct signal frequency components, which are not encoded/transmitted, and therefore not available at the receiver.

BWE can be placed at the decoder side of an audio coding system, or in the network. BWE systems increase signal bandwidth but also cause some signal degradation. Therefore, it would be both beneficial and desirable to estimate the expected gain of bandwidth extension before applying it (i.e. the BWE) to a signal.

In a multipoint audio conference, the bandwidths (BW) of audio channels are typically optimized independently. That is, the bandwidth and signal distortion of other channels are not taken into consideration. This approach leads to suboptimal solutions as the results from listening tests indicate that the perception of signal bandwidth depends on the level of signal distortion and bandwidth of surrounding channels.

SUMMARY

An object of the invention is to utilize a multipoint conference unit (MCU) for implementing bandwidth extension in a multipoint audio conference.

In one embodiment, a multipoint conference unit is disclosed. The multipoint conference unit comprises: input/output ports to communicate with at least three client terminals via at least three communication channels with each communication channel communicating with one of the at least three client terminals, memory to store data streams communicated between the multipoint conference unit and the client terminals, and a processor configured to mix data streams received from the client terminals and for storing the mixed data streams in the memory. The processor is also configured to determine a number of each of three different types of communication channels, and selectively implement bandwidth extension to the communication channels based on the determination.

In another embodiment, a method for implementing bandwidth extension by a multipoint conference unit is disclosed. The method includes determining a state of at least three communication channels used in a multipoint conference, the channels connecting the multipoint conference unit to at least three client terminals with each communication channel communicating with one of the client terminals, and selectively implementing bandwidth extension to the communication channels based on the determination.

The word "plurality" shall throughout the descriptions and claims be interpreted as "more than one".

BRIEF DESCRIPTION OF THE DRAWINGS

The several features, objects, and advantages of Applicant's invention will be understood by reading this description in conjunction with the drawings, in which:

FIG. 6 illustrates exemplary conditions for implementing bandwidth extension.

DETAILED DESCRIPTION

The following description of the implementations consistent with the present invention refers to the accompanying drawings. The same reference numbers in different drawings identify the same or similar elements. The following detailed description does not limit the invention. Instead, the scope of the invention is defined by the appended claims.

Figure 1:
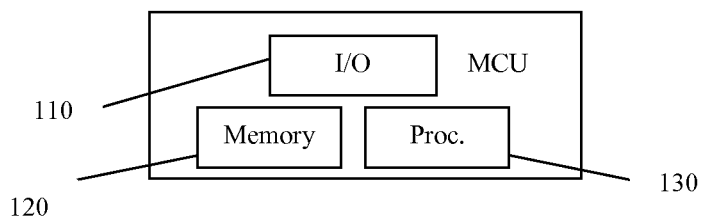
FIG. 1 illustrates a multi-point conference unit (MCU)
Figure 2:
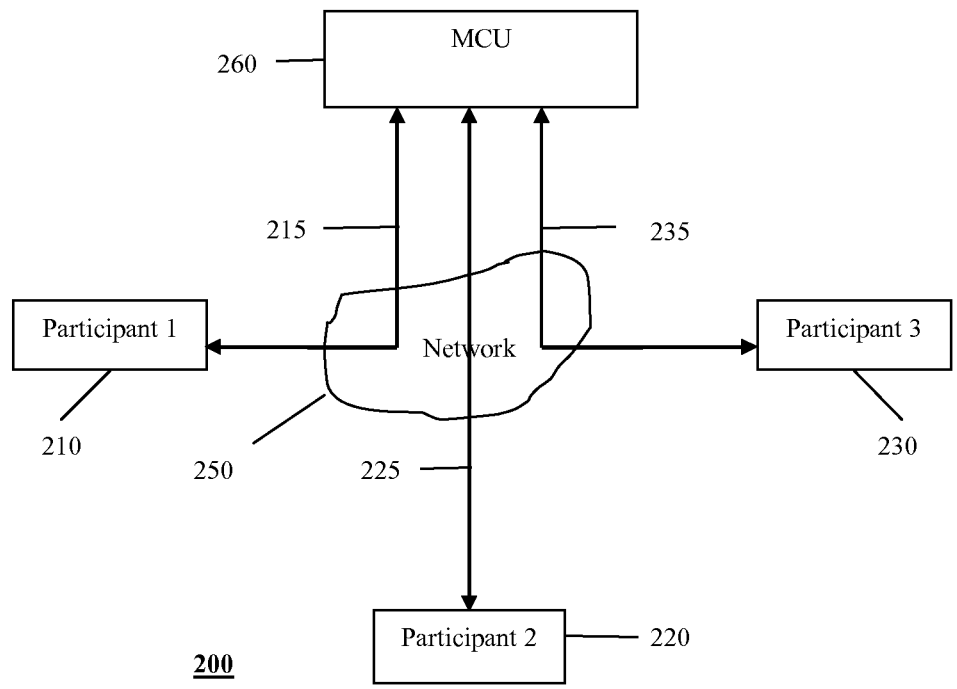
FIG. 2 illustrates a multi-point conference arrangement.
Figure 3:
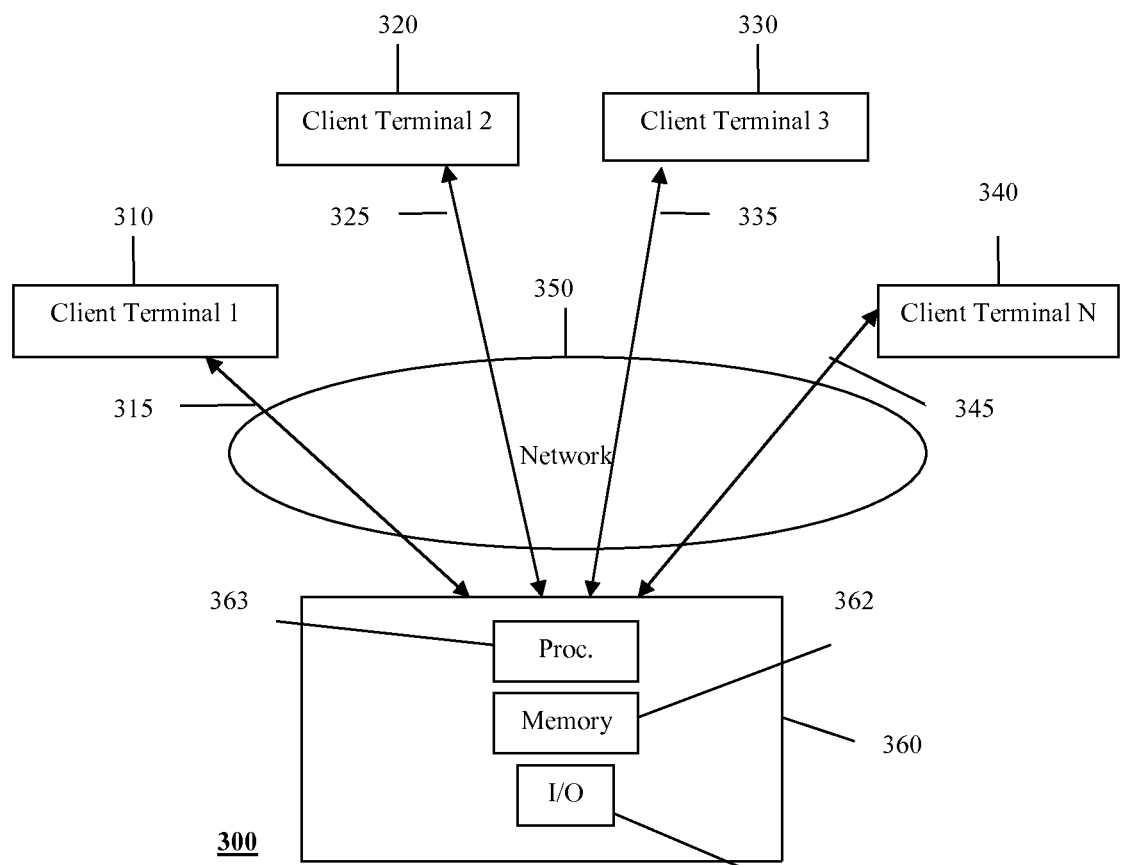
FIG. 3 illustrates an exemplary multi-point audio conferencing arrangement.

An exemplary system or arrangement for facilitating a multipoint audio conference is illustrated in FIG. 3. Audio conferencing system 300 may include a plurality (N) of client terminals 310, 320, 330 and 340. Each of the client terminals may submit unicast audio streams via corresponding communication channels 315, 325, 335 and 345 to a multipoint conference unit (MCU) 360.

MCU 360 may include input/output ports 361, memory 362 and processor 363. Processor 363 may be implemented as a single processing unit or a plurality of processing units in the MCU 360. MCU 360 may mix the audio streams from each client terminal and may transmit a single audio stream back to each client terminal via communication channels 315, 325, 335 and 345.

MCU 360 can determine the signal bandwidth of the communication channels based on the type of connection between the MCU 360 and the client terminal(s) 310, 320 and 330. If the connection is based on adaptive multi-rate narrowband audio codec (AMR-NB), then the communication channel operates in the narrowband frequency range (may refer to this as a narrowband channel). If the connection is based on adaptive wideband audio codec (AMR-WB codified as International Telecommunication Union (ITU-T) standard audio codec G.722.2), then the communication channel operates in the wideband frequency range (may refer to this as a wideband channel). If the connection is based on ITU-T standard codec G.722.1.0 for a super wideband (SWB), then the communication channel operates in the super wideband frequency range (may refer to this as super wideband channel).

By determining the type of connection between MCU 360 and each client terminal, the MCU can also determine how many of each type of connection are being used. For example, if the MCU determines that the communication channel with client terminal 310 operates in the narrowband frequency range and the communication channels with client terminals 320 and 330 operate in the wideband frequency range, then there is one narrowband channel and two wideband channels within the multipoint conference. In general, the connection with the client terminals may be any combination of narrowband, wideband and super wideband channels whose sum equals the number of client terminals (three in this example).

MCU 360 can further measure the signal distortion (SD) of signal quality for a channel of interest—that is, for a channel for which bandwidth extension may be considered. Signal quality may be measured according to known standards such as ANIQUE+ (Auditory Non-Intrusive Quality Estimation Plus) Model for Non-Intrusive Estimation of Narrowband Speech Quality and ITU-T P.563. The algorithms for measuring signal quality according to these proposed standards do not require access to the clean speech signal; the processed/degraded signal available at the MCU may be adequate.

Figure 4:
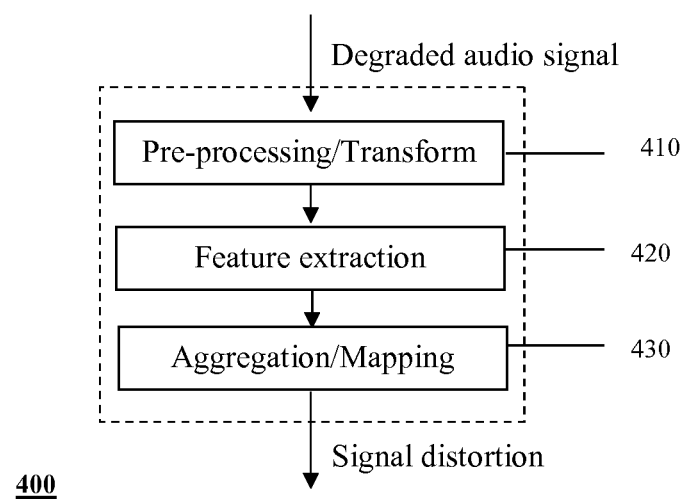
FIG. 4 illustrates a signal distortion method.

FIG. 4 illustrates an exemplary measurement method 400 for measuring signal distortion (quality). This measurement may be performed by processor 363 based on software instructions stored in memory 362 for example. In alternative embodiments, the measurement method 400 may performed by a signal distortion measurement module that may include a separate processor and related hardware. Measurement method 400 may include pre-processing/transforming 410, feature extraction 420 and aggregation/mapping 430.

Pre-processing/transforming is the filtering of the signal that is known to be on the listening path (e.g. IRS or ITU-T P.341 filtering). The pre-filtered signal is transformed to frequency domain.

Feature extraction is the extraction of signal parameters, which are meaningful for distortion estimation, from the signal. Exemplary signal parameters may include modulation spectrum, spectral clarity, estimated background noise, abrupt starts and stops, etc.

Aggregation/mapping is aggregation over time, followed by mapping of feature vector to a single distortion score. Mapping is typically performed by means of Gaussian-mixture models, artificial neural networks, piecewise linear model, etc.

According to exemplary embodiments, audio channels may be jointly optimized to improve quality by controlling the audio bandwidth of each channel.

Channels may be analyzed individually for bandwidth extension after determining the number of each type of channels (i.e. those operating in narrowband, wideband and super wideband frequency ranges) in an audio conference arrangement and measuring the signal distortion for each channel.

Bandwidth as described herein refers to non-zero frequency components in the perceived audio signal and not to providing additional capacity for transferring an increased amount of data for example.

The control mechanism may take into consideration certain factors regarding bandwidth and signal distortion for example. For instance, the bandwidth of an audio signal is perceived in relation to the bandwidth of other audio signals. Furthermore, the bandwidth and signal distortion affect the overall quality in a non-linear way.

A control mechanism for joint bandwidth extension optimization of audio channels according to exemplary embodiments may additionally be based on observations made in/from listening tests.

According to these observations, the importance of a bandwidth extension of a particular channel increases when surrounding signals have a higher bandwidth ("higher" relative to the bandwidth of this particular channel). This results from the fact that a signal may be perceived as being band limited if a higher reference bandwidth in the surrounding channels is available.

Figure 5:
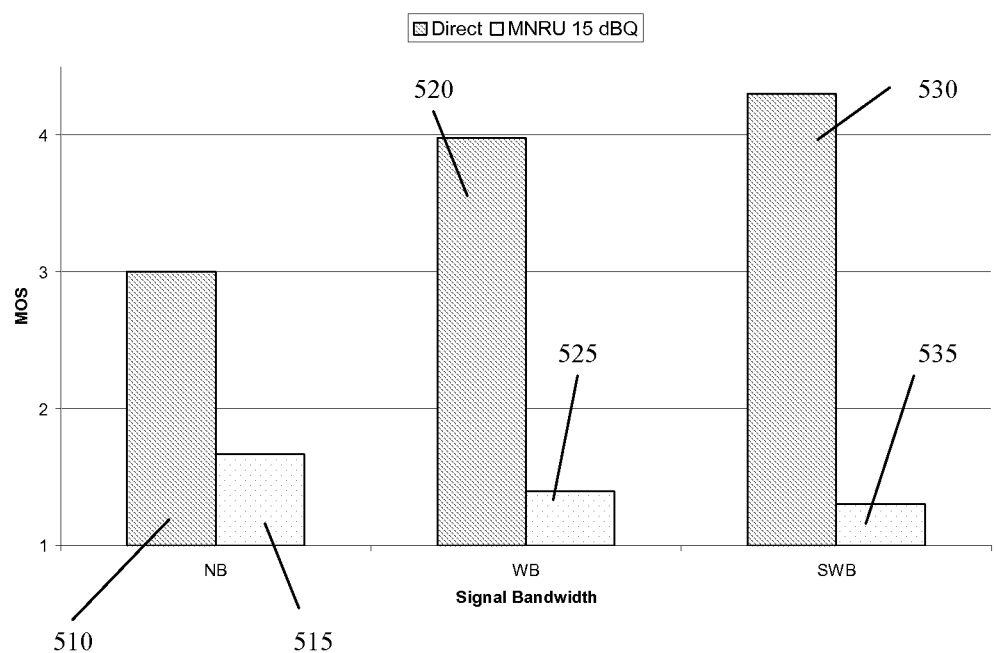
FIG. 5 illustrates signal quality relative to bandwidth.

In addition, bandwidth extension is not beneficial for signals with a high signal distortion. The higher bandwidth exposes a listener to an even more signal distortion. The effect of bandwidth limitations in the presence of speech correlated noise is illustrated in FIG. 5 based on listening tests wherein the quality is denoted by MOS or mean opinion score of the listeners.

For a clean (direct) signal, a higher bandwidth leads to a higher listening quality 510, 520 and 530. For a signal with correlated noise, this effect is reversed. That is, increased bandwidth leads to a lower listening quality 515, 525 and 535. BWE, therefore, may not be beneficial for signals with a high signal distortion.

Based on these observations, exemplary embodiments provide a mechanism for controlling the bandwidth extension in signal paths towards a receiver such as towards client terminal 310 of FIG. 3. Bandwidth extension can be implemented in a network or in a client terminal.

Bandwidth extension may be applied in many situations which entail various combinations of the numbers of narrowband, wideband and super wideband channels. Among these many combinations, a few are more prominent and likely scenarios. According to exemplary embodiments, these differing combinations may be highlighted and described further below.

For each of these combinations, it is assumed that it is possible to extend the bandwidth by a sufficient number of frequency components to match the highest bandwidth among the available audio channels.

As for the various designations used herein, $L_{NB}$, $L_{WB}$, and $L_{SWB}$ may be the number of channels operating in the narrowband, wideband and super wideband frequency ranges respectively. The narrowband may represent frequencies up to 3.5 kHz, the wideband may represent frequencies between 3.5 kHz and 7 kHz and the super wideband may represent frequencies above 7 kHz.

In an exemplary scenario, the number of narrowband channels may be zero while at least one of the number wideband channels or the number of super wideband channels are not equal to zero. That is, (i) the number of wideband channels may not equal to zero; or (ii) the number of super wideband channels may not equal to zero; or (iii) both the number of wideband channels and the number of super wideband channels may not equal to zero.

In this scenario, if the channel (for which bandwidth extension is being considered) has a signal distortion (SD) that is greater than or equal to a predetermined threshold ($\Theta$), then bandwidth extension may not be applied. If SD is less than the predetermined threshold, then bandwidth extension may be applied.

This may be represented by: $L_{NB}=0$ and ($L_{WB} \neq 0$ or $L_{SSB} \neq 0$). BWE may not be activated if the channel SD$\geq\Theta$; otherwise, BWE may be activated.

In another exemplary scenario, the number of wideband channels and the number of super wideband channels may be zero and the number of narrow band channels may not be equal to zero. Bandwidth extension may be activated in this arrangement. This may be represented by $L_{NB} \neq 0$ and $L_{WB}=L_{SWB}=0$. BWE may be activated. The bandwidth of the channels is low in this scenario so that BWE is necessary.

In a yet another exemplary scenario, the number of super wideband channels may be equal to or greater than the sum of the number of wideband channels and the number of narrowband channels. In the alternative, the number of wideband channels may be equal to or greater than the number of narrowband channels. Bandwidth extension may be activated in this arrangement. This may be represented by $L_{SWB} \geq L_{WB} + L_{NB}$ or $L_{WB} \geq L_{NB}$. BWE may be activated. Since channels with high bandwidth dominate in this scenario, bandwidth limitation may cause strong degradation.

In a further exemplary scenario, the number of super wideband channels may be less than the sum of the number of wideband channels and the number of narrowband channels. In the alternative, the number of wideband channels may be less than the number of narrowband channels. If the channel has a signal distortion (SD) that is greater than or equal to a predetermined threshold (designated as $\Theta$), then bandwidth extension may not be activated or applied.

If the signal distortion is less than the predetermined threshold, then bandwidth extension may be activated or applied.

This may be represented by $L_{SWB} < L_{WB} + L_{NB}$ or $L_{WB} < L_{NB}$. BWE may not be activated if the channel SD$\geq\Theta$; otherwise (i.e. SD$<\Theta$), BWE may be activated.

Exemplary scenarios as highlighted above may be summarized in table 600 of FIG. 6.

Figure 7:
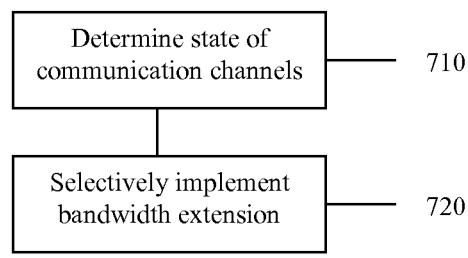
FIG. 7 illustrates a method in accordance with exemplary embodiments.

A method in accordance with exemplary embodiments is illustrated in FIG. 7. The state of a number of communication channels used in a multi point audio conference may be determined at 710. The determination may consist of identifying a number of each of a different frequency range of communication channels. Bandwidth may be implemented selectively based on the determination at 720.

The threshold value $\Theta$ may be adjusted based on the type of audio reproduction equipment being employed at client terminal 310 of FIG. 3. In general, high-fidelity equipment decreases the threshold value.

Signal distortion may be estimated by known, standardized tools. It may also be obtained by direct signal measurement such as, for example, by calculating the average spectral flatness over the speech active segments.

Certain advantages may be realized via implementation of exemplary embodiments as highlighted. The method improves quality of experience in a multiparty audio conference by controlling the bandwidth extension (BWE) of a particular audio signal with respect to its signal distortion (SD) level and bandwidth (BW) of other channels. The control mechanism as highlighted according to exemplary embodiments does not increase the network load, and in some cases can even decrease transmitted bits.

While exemplary embodiments describe an audio conference setting, it may be equally applicable to an audio component of a teleconferencing setup that may also include a video component. Client terminals may include any type of devices that facilitate an audio communication such landline phones, mobile/smart phones, computers, etc.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A multipoint conference unit comprising:
   input/output ports to communicate with at least three client terminals via at least three communication channels with each communication channel communicating with one of the at least three client terminals;
   memory to store data streams communicated between the multipoint conference unit and the client terminals; and
   a processor to mix data streams received from the client terminals and to store the mixed data streams in the memory, wherein the processor is further configured to:

determine a number of each of three different types of communication channels; and selectively implement bandwidth extension to the communication channels based on the determination, wherein the processor is configured to determine a number of the communication channels operating in each of a narrowband, a wideband and a super wideband frequency ranges, and wherein the processor is configured to implement bandwidth extension in response to when a number of communication channels operating in the super wideband frequency range is at least equal to a sum of a number of communication channels operating in the wideband frequency range and a number of communication channels operating in the narrowband frequency range.

2. A multipoint conference unit comprising:

input/output ports to communicate with at least three client terminals via at least three communication channels with each communication channel communicating with one of the at least three client terminals;

memory to store data streams communicated between the multipoint conference unit and the client terminals; and a processor to mix data streams received from the client terminals and to store the mixed data streams in the memory, wherein the processor is further configured to:

determine a number of each of three different types of communication channels; and selectively implement bandwidth extension to the communication channels based on the determination, wherein the processor is configured to determine a number of the communication channels operating in each of a narrowband, a wideband and a super wideband frequency ranges, and wherein the processor is configured to implement bandwidth extension in response to when a number of communication channels operating in the wideband frequency range is at least equal to a number of communication channels operating in the narrowband frequency range.

3. A multipoint conference unit comprising:

input/output ports to communicate with at least three client terminals via at least three communication channels with each communication channel communicating with one of the at least three client terminals;

memory to store data streams communicated between the multipoint conference unit and the client terminals; and a processor to mix data streams received from the client terminals and to store the mixed data streams in the memory, wherein the processor is further configured to;

determine a number of each of three different types of communication channels; and selectively implement bandwidth extension to the communication channels based on the determination, wherein the processor is configured to measure a signal distortion value for at least one of the three communication channels, wherein the processor is configured to determine a number of the communication channels operating in each of a narrowband, a wideband and a super wideband frequency ranges, and wherein the processor is configured to implement bandwidth extension in response to when a number of communication channels operating in the super wideband frequency range is less than a sum of a number of communication channels operating in the wideband frequency range and a number of communication channels operating in the narrowband frequency range and the signal distortion value is below a predetermined threshold.

4. The multipoint conference unit of claim 3, wherein the signal distortion value is obtained by calculating an average spectral flatness over active speech segments of the communication between the client terminals.

5. A multipoint conference unit comprising:

input/output ports to communicate with at least three client terminals via at least three communication channels with each communication channel communicating with one of the at least three client terminals;

memory to store data streams communicated between the multipoint conference unit and the client terminals; and a processor to mix data streams received from the client terminals and to store the mixed data streams in the memory, wherein the processor is further configured to:

determine a number of each of three different types of communication channels; and selectively implement bandwidth extension to the communication channels based on the determination, wherein the processor is configured to measure a signal distortion value for at least one of the three communication channels, wherein the processor is configured to determine a number of the communication channels operating in each of a narrowband, a wideband and a super wideband frequency ranges, and wherein the processor is configured to implement bandwidth extension in response to when a number of communication channels operating in the wideband frequency range is less than a number of communication channels operating in the narrowband frequency range and the signal distortion value is below a predetermined threshold.

6. The multipoint conference unit of claim 5, wherein the signal distortion value is obtained by calculating an average spectral flatness over active speech segments of the communication between the client terminals.

7. A multipoint conference unit comprising:

input/output ports to communicate with at least three client terminals via at least three communication channels with each communication channel communicating with one of the at least three client terminals;

memory to store data streams communicated between the multipoint conference unit and the client terminals; and a processor to mix data streams received from the client terminals and to store the mixed data streams in the memory, wherein the processor is further configured to:

determine a number of each of three different types of communication channels; and selectively implement bandwidth extension to the communication channels based on the determination, wherein the processor is configured to measure a signal distortion value for at least one of the three communication channels, wherein the processor is configured to determine a number of the communication channels operating in each of a narrowband, a wideband and a super wideband frequency ranges, and wherein the processor is configured to implement bandwidth extension when the communication channels operate in at least one of the wideband frequency range and the super wideband frequency range and the signal distortion value is below a predetermined threshold.

8. The multipoint conference unit of claim 7, wherein the signal distortion value is obtained by calculating an average spectral flatness over active speech segments of the communication between the client terminals.

* * * * *